United States Patent
Bostoen et al.

(10) Patent No.: US 7,664,254 B2
(45) Date of Patent: Feb. 16, 2010

(54) SYSTEM AND METHOD FOR UPSTREAM POWER BACKOFF FOR XDSL

(75) Inventors: Tom Bostoen, Brugge St. Andries (BE); Thierry Pollet, Mechelen (BE)

(73) Assignee: Alcatel, Paris (FR)

( * ) Notice: Subject to any disclaimer, the term of this patent is extended or adjusted under 35 U.S.C. 154(b) by 1508 days.

(21) Appl. No.: 10/261,486

(22) Filed: Oct. 2, 2002

(65) Prior Publication Data

US 2003/0099350 A1    May 29, 2003

(30) Foreign Application Priority Data

Oct. 3, 2001    (EP)    ................... 01402558

(51) Int. Cl.
*H04M 1/24* (2006.01)
(52) U.S. Cl. ................... 379/417; 379/27.01
(58) Field of Classification Search ................ 379/417, 379/1.04, 3, 22.02, 27.03, 29.09, 27.01, 22.08; 370/254.5
See application file for complete search history.

(56) References Cited

U.S. PATENT DOCUMENTS

| | | | |
|---|---|---|---|
| 6,205,220 B1 * | 3/2001 | Jacobsen et al. | 379/417 |
| 6,263,047 B1 * | 7/2001 | Randle et al. | 379/31 |
| 6,292,539 B1 | 9/2001 | Eichen et al. | |
| 6,724,859 B1 * | 4/2004 | Galli | 379/1.04 |

FOREIGN PATENT DOCUMENTS

EP    0985933 A2    3/2000

OTHER PUBLICATIONS

W. Y. Chen, DSL Simulation Techniques and Standards, 1998, MacMillan, Indianapolis XP002191198.

* cited by examiner

*Primary Examiner*—Walter F Briney, III
(74) *Attorney, Agent, or Firm*—Sughrue Mion, PLLC

(57) ABSTRACT

A method and apparatus for modeling a network comprising a plurality of transmission lines is described, the method and system being adapted to measure loop parameters of first transmission line to provide measured loop parameters, determine a topology of the first transmission line by analyzing the measured loop parameters with reference to at least a one model of a plurality of models for transmission lines of different topologies, select a further model for estimating crosstalk related parameters based on the determined topology, and estimate at least one crosstalk related parameter based on the determined topolgy and the selected further model.

17 Claims, 10 Drawing Sheets

SYSTEM AND METHOD FOR UPSTREAM POWER BACKOFF FOR XDSL

The present invention relates to simulation methods for telecommunications networks and to telecommunications networks themselves having a plurality of transmission lines with receivers and transmitters connected by some form of communications channel which is subject to crosstalk. The present invention is especially useful for the prediction and adjustment of network parameters such as a transmission powers, in particular for use in xDSL networks as well as for simulating such networks.

TECHNICAL BACKGROUND

The acronym xDSL stands for the family of Digital Subscriber Line technologies, which allow high-speed access to the Internet and multimedia services over the local loop, which connects the CP (customer premises) to the CO (central office), that is over simple twisted pair cables. An xDSL transceiver at the CO communicates with an xDSL transceiver at the CP over the local loop.

Since decades the local loop, which is a transmission line consisting of two twisted copper wires, also called unshielded twisted pair (UTP), has given the customer access to POTS (Plain Old Telephony Service). The POTS signal, transmitted over the local loop, is analog and contained in the frequency band up to 4 kHz, which corresponds to the spectral content of speech.

xDSL exploits the frequency band above 4 kHz up to several MHz, which is not used by POTS. However as the legacy local loops have been engineered for voice-band transmission, there are no guarantees about the quality of the local loop with respect to transmission in this higher frequency band. The signal-to-noise ratio (SNR) as a function of the frequency at the receiver at the CP, respectively the CO, for the downstream transmission (from the CO to the CP), respectively the upstream transmission (from the CP to the CO) plays an important role. The SNR at the receiver at the CP, respectively the CO, is determined as a function of the frequency by the transfer function of the loop between the CO and the CP and the noise PSD (Power Spectral Density) at the CP, respectively the CO given the PSD of the transmitted signal at the CO, respectively the CP.

$$C = \int_0^W \log_2\left(1 + \frac{P(f)}{N(f)}\right) df \quad (1)$$

$$P(f) = |H(f)|^2 S(f) \quad (2)$$

In general the local loop consists of a network of transmission lines. Every line in the network is a UTP characterized by its length and type. The line type specifies the cross-sectional geometrical dimensions, such as the wire diameter (also called wire gauge), and the material physical constants, such as the electrical permittivity of the dielectric separating the 2 copper wires. The most used wire diameters are 0.4 mm, 0.5 mm, and 0.6 mm. Polyethylene (PE) is the most occurring insulator but other materials are also used such as paper and PVC.

The network topology of the local loop is limited to a tree structure. The simplest topology is a single line. The magnitude of the transfer function reflects the attenuation of the line, which gets worse with increasing frequency and line length. Another topology that exists for long loops is a cascade of 2 or more lines with increasing wire diameter from the CO to the CP. For this topology reflections are caused by the change of the wire diameter at the splices connecting 2 lines. A topology that is also frequently encountered, especially in the USA, is a loop with 1, 2 or more bridged taps. A bridged tap is an open-ended line spliced to the main line. Reflections appear for this topology at the splice connecting the bridged tap to the loop and at the open end of the bridged tap. Reflections have a negative impact on the transfer function, because they interfere with the signal propagating along the direct path. For those frequencies for which the interference is destructive, the magnitude of the transfer function reduces. Such reductions rarely appear in the voice band because the bridged taps are usually not too long.

As the twisted pairs constituting the local loop are unshielded, external electromagnetic waves may couple into the loop and propagate towards the CO and the CP causing noise at the receiver. The electromagnetic coupling is reduced by the twisting of the 2 wires, because adjacent segments of the twisted pair experience electromagnetic waves with opposite polarity. In addition the twisting improves the balance of the line. A line is balanced when the 2 conductors have an equal impedance towards the earth. The balancing of the line prevents a common-mode signal from transforming into a differential-mode signal. In the case of a common-mode signal the 2 wires carry equal currents and the return path of the current is the ground. For a differential-mode signal the 2 wires carry opposite currents (out of phase currents). Electromagnetic waves may couple into the line because of imperfect twisting, and the common-mode signal that they cause, may transform into a differential-mode signal because of imperfect balancing, which is correlated with the twisting. Balance decreases with increasing frequency.

The noise is divided into 2 different types according to the origin of the external electromagnetic waves coupling into the loop. The first type of noise is crosstalk, which is the electromagnetic coupling between twisted pairs in the same cable or between cables. The cables leaving the CO contain thousands of twisted pairs. The closer to the CP the less pairs there are present in a cable. A difference is made between near-end crosstalk (NEXT) and far-end crosstalk (FEXT). The transmitters at the CO, respectively CP, are the source of NEXT for the near-end receivers at the CO, respectively the CP, and are the source of FEXT for the far-end receivers at the CP, respectively the CO. In general crosstalk gets worse with increasing frequency.

A second type of noise is radio-frequency interference (RFI), which is caused by radio waves coupling into the local loop, that acts as an antenna, especially if there are aerial lines. There are 2 major sources of radio waves in the frequency band of xDSL namely AM radio and amateur radio.

Hence, the local loop has several impairments for transmission in the frequency band of xDSL, which are not present for voice-band transmission.

Various proposals have been made to calculate or estimate FEXT at a port of a transmission line. The methods of T1.413 [ANSI, 1995] assume that all loops are symmetrical, i.e. that the receivers can be replaced by the transmitters and vice versa. This may be unreasonable because:

a) It is very unlikely that the loop under test and an interfering loop will have the same tolopogies, e.g. the same number of bridge taps. A bridge tap in only the test loop will reduce performance, a bridge only in the interfering loop will improve performance.

b) Since most bridge taps are closer to the CP than the CO this is most important in the upstream direction. Not all CP's are the same distance away. Short cables will have a serious affect on long cables at the CO.

In the early 1980's many hundreds of thousands of measurements of crosstalk were made; mostly on 50 pair binder groups that are used for interexchange transmission of T1 and T2 signals. These included pair-to-pair measurements and pairs to one measurements. From these measurements cumulative probability density functions were plotted and some worst-case probabilities estimated. Analysis of this type has resulted in various empirical formulae which are supposed to provide reasonable estimations. However, such empirical formulae are unsatisfactory especially when systems are considered that differ greatly from those from which the empirical results have been obtained. Also when applying xDSL to legacy networks the topology of the loops is often not known so that no assessment can be made as to whether the model used is suitable.

Upstream power backoff (UPBO) guarantees spectral compatibility between long and short loops that are operating in the same cable binder. UPBO is a method by which the upstream power spectrum density ($PSD_{transmit}$) being generated by a transmitter on a short disturber line is controlled in order to limit excessive crosstalk into neighbouring lines. The crosstalk measured at the line terminator of the victim loop impacts on the bit rate performance of the victim loop. A current method of UPBO is based on an estimation of the length of the loop. The electrical length is obtained by comparing the attenuation of the loop under consideration with the attenuation of a reference loop. This reference loop consists of a single line segment. The $PSD_{transmit}$ is determined by $(PSD_{ref})/|TF|$ where TF is the transfer function of the disturber loop which is a function of the electrical length of this loop. This method is only useful for single segment loops, i.e. with no bridge tap, no mixed wire gauges nor imperfect terminations. Particularly, bridge taps can result in imperfect performance as indicated above.

It is an object of the present invention to provide a method and apparatus for the upstream backoff of combinations of transmission lines which are more accurate and/or flexible than conventional methods and apparatus.

It is a further object of the present invention to provide a method and apparatus for simulation of crosstalk-related parameters in transmission lines which are more accurate and/or flexible than conventional methods and apparatus.

SUMMARY OF THE INVENTION

An aspect of the present invention may be described as a method and apparatus for modeling a network comprising a plurality of transmission lines, the method and system being adapted to measure loop parameters of a transmission line to provide measured loop parameters, determine a topology of the first transmission line by analysing the measured loop parameters with reference to at least a one model of a plurality of models for transmission lines of different topologies, select a further model for estimating crosstalk related parameters based on the determined topology, and estimate at least one crosstalk related parameter based on the determined topology and the selected further model. The method may include determining a transmit power spectrum for a transmitter on the network in accordance with the estimated crosstalk related parameter. The crosstalk related parameter may be a transfer function for at least one of FEXT, NEXT, alien-NEXT, alien-FEXT, EL-FEXT, EL-NEXT, self-NEXT, self-FEXT.

The measuring step may include carrying out a two-port measurement of the transmission line by inputting an excitation signal at one port of the transmission line and measuring the received signal at another port of the transmission line; deriving from the received signal a transfer function of the transmission line; generating a 2-port parametric model of the transmission line; and optimising values of the parameters of the 2-port parametric model by reducing the difference between the derived transfer function and a transfer function calculated from the at least one model. Alternatively, the measuring step may comprise carrying out a 1 port measurement on the network by inputting an excitation signal at one port of the network and recording the results at the port; generating a 1 port parametric model of the network; and optimising the values of the parameters of the 1 port parametric model by reducing the difference between the results of the measurement step and results calculated using the 1-port parametric model and the excitation signal. The reducing step may be carried out by minimizing a cost function by adapting the values of the parameters of the relevant parametric model, the cost function representing a quantification of the difference. The method may comprise the step of determining a length of the transmission line as an output of the optimising step.

In one aspect of the present invention an estimation of the end-to-end transfer function of at least one transmission line is based on measurements at one termination location thereof only or at two or more locations. The invention includes the characterization of the transmission line even though its length and topology is unknown. This characterisation can be used to predict the transfer function for the line. Alternatively, the transfer function may be measured directly, e.g. by using tones emitted from modems at each end of the transmission line. In order to characterize the transmission line an excitation signal is generated at one or more termination locations thereof, e.g. at a central-office end of a local loop depending on which method is used to obtain the transfer function. For the single port measurement method a response signal is measured at the same location as the excitation signal is generated. This excitation signal corresponds to the incident wave and the response signal to the reflected wave. The latter is also called reflectogram. This measurement procedure is called reflectometry (time-domain reflectometry, or TDR, if the signals are measured in the time domain). The ratio of the reflected wave and the incident wave is defined as the scattering parameter $S_{11}$ (also called reflection factor in the case of a 1-port). So the scattering parameter $S_{11}$ of a certain transmission line describes how that line responds in terms of a reflected wave, if it is excited with a certain incident wave. The complete model of the line considered as a 2-port consists of the 4 scattering parameters $S_{11}$, $S_{21}$, $S_{12}$, and $S_{22}$. The transfer function is related to the scattering parameter $S_{21}$.

A transmission loop, e.g. a local loop usually consists of a network of transmission lines connecting the customer premises to the central office. The network topology is limited to a tree structure. Every line in the network is characterized by its length and type. The line type specifies the cross-sectional geometrical dimensions and the material constants.

If two port measurements are used then the excitation signals are entered at each end of the transmission line separately and the received signal measured at the other end.

The above methods may include a step of reducing the difference between measured values (two port or one port) and the model by:

quantifying said difference as a cost function; and
iteratively minimizing said cost function by adapting parameter values of said frequency domain parametric model.
The cost function may be a maximum likelihood estimator or a Bayesian estimator.

The output of any of the above methods can be at least one of:
a message that the at least one transmission line cannot be modeled within a predetermined accuracy for the parametric model or for the model of crosstalk parameters, e.g. FEXT
a necessary power back-off at a transmitter;
a PSD at a receiver or a PSD of a transmitter.

In the above methods the at least one transmission line can be a local loop of an access network.

The present invention may also provide a system for modeling a network, comprising: means for measuring loop parameters of first transmission line to provide measured loop parameters, means for determining a topology of the first transmission line by analysing the measured loop parameters with reference to at least a one model of a plurality of models for transmission lines of different topologies, means for selecting a further model for estimating crosstalk related parameters based on the determined topology, and means for estimating at least one crosstalk related parameter based on the determined topology and the selected further model. The system may comprise means for determining a transmit power spectrum for a transmitter on the network in accordance with the estimated crosstalk related parameter. The crosstalk related parameter may be a transfer function for at least one of FEXT, NEXT, alien-NEXT, alien-FEXT, EL-FEXT, EL-NEXT, self-NEXT, self-FEXT. The means for measuring may include means for carrying out a two-port measurement of the transmission line by inputting an excitation signal at one port of the transmission line and measuring the received signal at another port of the transmission line, further comprising means for deriving from the received signal a transfer function of the transmission line; means for generating a 2-port parametric model of the transmission line; and means for optimising values of the parameters of the 2-port parametric model by reducing the difference between the derived transfer function and a transfer function calculated from the at least one model. The means for measuring may comprise means for carrying out a 1 port measurement on the network by inputting an excitation signal at one port of the network and recording the results at the port; further comprising: means for generating a 1 port parametric model of the network; and means for optimising the values of the parameters of the 1 port parametric model by reducing the difference between the results of the measurement step and results calculated using the 1-port parametric model and the excitation signal. The means for optimising may include means for reducing the difference by minimizing a cost function by adapting the values of the parameters of the relevant parametric model, the cost function representing a quantification of the difference. The means for optimising may include means for determining a length of the transmission line.

The above systems may include processing means including means for estimating a transfer function of said at least one transmission line.

In the above systems, the means for reducing the difference may include:
means for quantifying said difference as a cost function; and
means for iteratively minimizing said cost function by adapting parameter values of said frequency domain parametric model.

The above systems may include means for outputting at least one of:
a message that the at least one transmission line cannot be modeled within a predetermined accuracy;
a power back-off to be set at a transmitter;
a PSD at a receiver.

In the above systems the at least one transmission line may be a local loop of an access network.

The above systems for modeling may be included in a central office system of a telecommunications network.

The present invention also includes a data carrier medium carrying one or more computer readable code segments for controlling a processing device to carry out any method in accordance with the present invention.

The present invention also includes a computer program product for execution of any of the methods in accordance with the present invention on a computer system.

The present invention also includes a method for modelling a representation of network, said method comprising:
transmitting a description of the network from a near location to a remote computing system via a telecommunications network,
executing on the remote computer system any of the methods of the present invention, and
transmitting to a near location information relating to crosstalk in the network.

The present invention will now be described with reference to the following drawings.

DESCRIPTION OF THE DETAILED EMBODIMENTS

Figure 1:
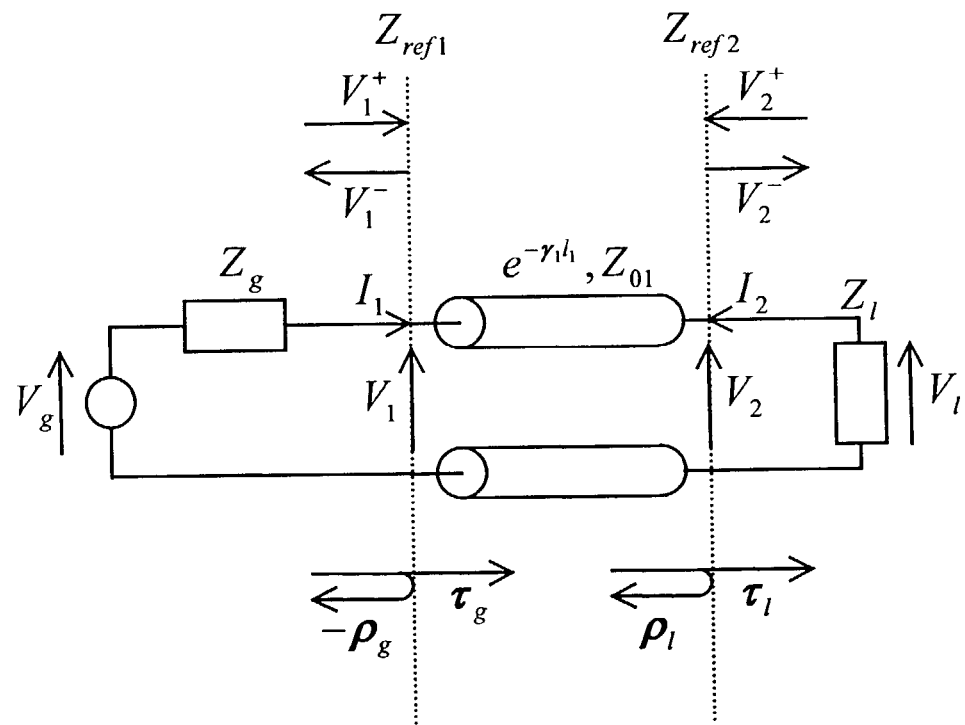
FIG. 1 shows a transmission line model of a single loop.

The present invention will be described with reference to certain embodiments and drawings but the present invention is not limited thereto but only by the claims. In the following embodiments of the present invention will be described by a parametric model detailed for a limited number of network topologies but this does not limit the applicability of the invention. The skilled person will appreciate that the present invention may be extended to other topologies and to other materials once the principles of the present invention have been understood. All such additional topologies are included within the scope of the present invention. Also in the description a twisted pair transmission line model is given. However the invention is not limited to this model and is not limited to twisted pair cables as transmission lines. The application of the present invention is not limited in this respect and it can be used for symmetric or asymmetric lines, for example in the case of coaxial cables, optical fibers, etc. and even in the case of a general 2-port network. Further, the invention will mainly be described with reference to FEXT but the present invention is not limited thereto but can be applied to other forms of crosstalk such as NEXT, alien-NEXT (influences by electromagnetic interference from outside the network), alien-FEXT, EL-FEXT, EL-NEXT, self-NEXT, self-FEXT. A general reference book for xDSL is "ADSL, VDSL and multicarrier modulation", by John Bingham, Wiley, 2000. The following references may also be found useful for understanding the present invention.

[1] P. Boets, "Frequency Domain Identification of Transmission Lines from Time Domain Measurements", Ph-D. Thesis, Vrije Universiteit Brussel, Dept. ELEC, Pleinlaan 2, 1050 Brussels, June 1997. This document is incorporated by reference in its totality.

[2] P. Boets, M. Zekri, L. Van Biesen, T. Bostoen, and T. Pollet, "On the Identification of Cables for Metallic Access Networks," in Proc. IMTC, 2001, incorporated by reference in its totality.

[3] D. M. Pozar, *Microwave Engineering*, 2nd ed. New York: John Wiley & Sons, 1998.

T. Starr, J. M. Cioffi, and P. J. Silverman, *Understanding Digital Subscriber Line Technology*

The present invention may be summarised as follows. One or more measurements of a transmission loop of a communications network are made. These measurements are compared with one or more parametric models of predefined loop topologies. The parameters of each topology model are optimised to give the best fit to the measurement results. This optimisation may be done by minimising or maximising a cost function. From this analysis a best fit topology is determined, i.e. a topology is chosen which corresponds to the best fit model to the measured results. Parameters available from the parametric model are fed into a parametric crosstalk model of the same topology as the best fit topology. This crosstalk model is used to obtain a crosstalk-related parameter of the network, e.g. FEXT, NEXT, self-FEXT, self-NEXT, alien-NEXT, alien-FEXT, EL-FEXT or EL-NEXT, a PSD at a receiver, a power back-off to obtain a certain PSD at a receiver. A step in the above method is obtaining the transfer function of a loop. This can be obtained by two-port or on-port measurements in accordance with separate embodiments of the present invention.

1. One-port Method of Obtaining the Transfer Function

In accordance with an embodiment of the present invention, given a specified or assumed network topology, a 1-port parametric model for the $S_{11}$ scattering parameter of the network is derived from the models for individual line sections of the network or based on an assumed model. In an $S_{11}$ scattering parameter model the parameters of the individual lines appear as independently identifiable parameters. It is then possible to model the loop completely by only measuring the scattering parameter $S_{11}$. The unknown parameters have to be estimated by a further optimization routine. The optimized parameters are used in a 2-port model of the network for further analysis of the network.

Accordingly, each line in a network is fully characterized by a parametric model, which consists of the characteristic impedance and the transfer function of the line as a function of the frequency and a number of unknown parameters. Several line models are available. A model based on electromagnetic theory is one of the most useful for the line characterization. This model is based on the 4 primary transmission line parameters, which are resistance, inductance, conductance, and capacitance, as a function of the frequency and a number of parameters related to the cross-sectional geometrical dimensions and material constants. These latter parameters are considered to be unknown. In the following, it will be assumed that the transmission line comprises twisted pair cables. For other cable types, equivalent models may be selected. For twisted pair cable, the electromagnetic model assumes that the wire for the local loop comprises 2 cylindrical conductors with the same diameter immersed in a homogeneous dielectric. It allows for the skin effect and the proximity effect (up to 2 terms in the Fourier series solution). It contains 5 independently identifiable parameters, which are related to the cross-sectional geometric dimensions and material constants of the components of the twisted pair cables. The electrical permittivity of the dielectric is considered to be independent of the frequency in this model and the conductance is neglected, which are good approximations for polyethylene (PE). This line model will be called VUB1.

Parameter estimation is an important part of characterization of a loop in accordance with the present invention. In accordance with an embodiment of the present invention the difference between measured values for a loop and the modeled values for the same loop is reduced by appropriate selection/determination of the unknown parameters. For example, a cost function may be introduced which quantifies the deviation between the measured values (reflectogram) and the result of modeling the scattering parameter $S_{11}$ of the loop as a function of the model parameters. In order to match the model as well as possible to the measured values the cost function is minimized as a function of the model parameters. The values of the model parameters corresponding to this minimum are the estimated values of the parameters. The lower limit of the variance of the estimated parameters may given by any suitable method, e.g. by the Cramer-Rao lower bound. The cost function is also called an estimator, because it determines the parameter estimation completely. Several estimators are available. The maximum likelihood estimator (MLE) is preferred because it is consistent, asymptotically unbiased, asymptotically normally distributed, and asymptotically efficient under certain noise assumptions. In addition it is robust. It has such good properties because it takes the noise in the measurement into account. This means of course that this noise has to be measured. The characterization is typically performed in the frequency domain and the measurement in the time domain but the present invention is not limited thereto. Measurements and characterization may be performed in either the time domain or the frequency domain.

The minimum of the cost function as a function of the model parameters is found by means of an optimization algorithm. Typically, this optimization algorithm will be iterative There are several known optimization routines which may be used. The Levenberg-Marquardt (LM) method is preferred. It combines the Gauss-Newton and gradient descent procedures. The Gauss-Newton method is very fast, because it makes use of second-order derivatives, but it does not always converge. This problem of convergence is solved in the Levenberg-Marquardt algorithm by addition of the gradient descent method. The Levenberg-Marquardt algorithm only searches for a local minimum. In order to find the global minimum, the initial values of the model parameters are preferably chosen to be close enough to the exact values, which correspond to the global minimum of the cost function so that the optimization does not become trapped in a local minimum. As the estimated parameters are available for all the individual lines, the loop is completely modeled and the estimated transfer function can be calculated.

In accordance with an embodiment of the present invention, a suitable optimization is based on a $S_{11}$ scattering parameter measurement, an MLE cost function and an LM optimization algorithm. The $S_{11}$ scattering parameter model depends on the network topology and the model for the individual line sections. For every different network topology and line model there is a different $S_{11}$ scattering parameter model. This model has to be calculated. Independently identifiable parameters have to be determined. The derivatives of the model to its parameters have to be computed, because they are needed for the Jacobian in the LM optimization algorithm.

This has been illustrated for 3 different loop topologies: a single line, a cascade of 2 lines, and a loop with 1 derivation, also called bridged tap, but the skilled person will appreciate after having understood the present invention that it may be extended to other topologies. For all these loop topologies the assumption has been made that the loop is open at the customer-premises end, which is a fair approximation of a phone set that is on-hook. For the loop with a bridged tap an additional assumption is that all the individual lines are of the same type. These 3 loop topologies have been chosen to cover all the different causes for reflections in a loop: the mismatch between the generator impedance and the characteristic impedance of the line connected to it, the mismatch between the load impedance and the characteristic impedance of the line connected to it, the mismatch between 2 lines with a different characteristic impedance connected to each other, and the mismatch due to the connection of a derivation.

When the topology of a loop is unknown an alternative method in accordance with an embodiment of the present invention tries each one of a series of well known topologies and makes an optimization of the unknown parameters for each topology by comparison with the reflectogram. The topology which appears to give the best fit with the reflectogram may then taken as the best fit topology for the calculation of the network capacity.

Figure 11:
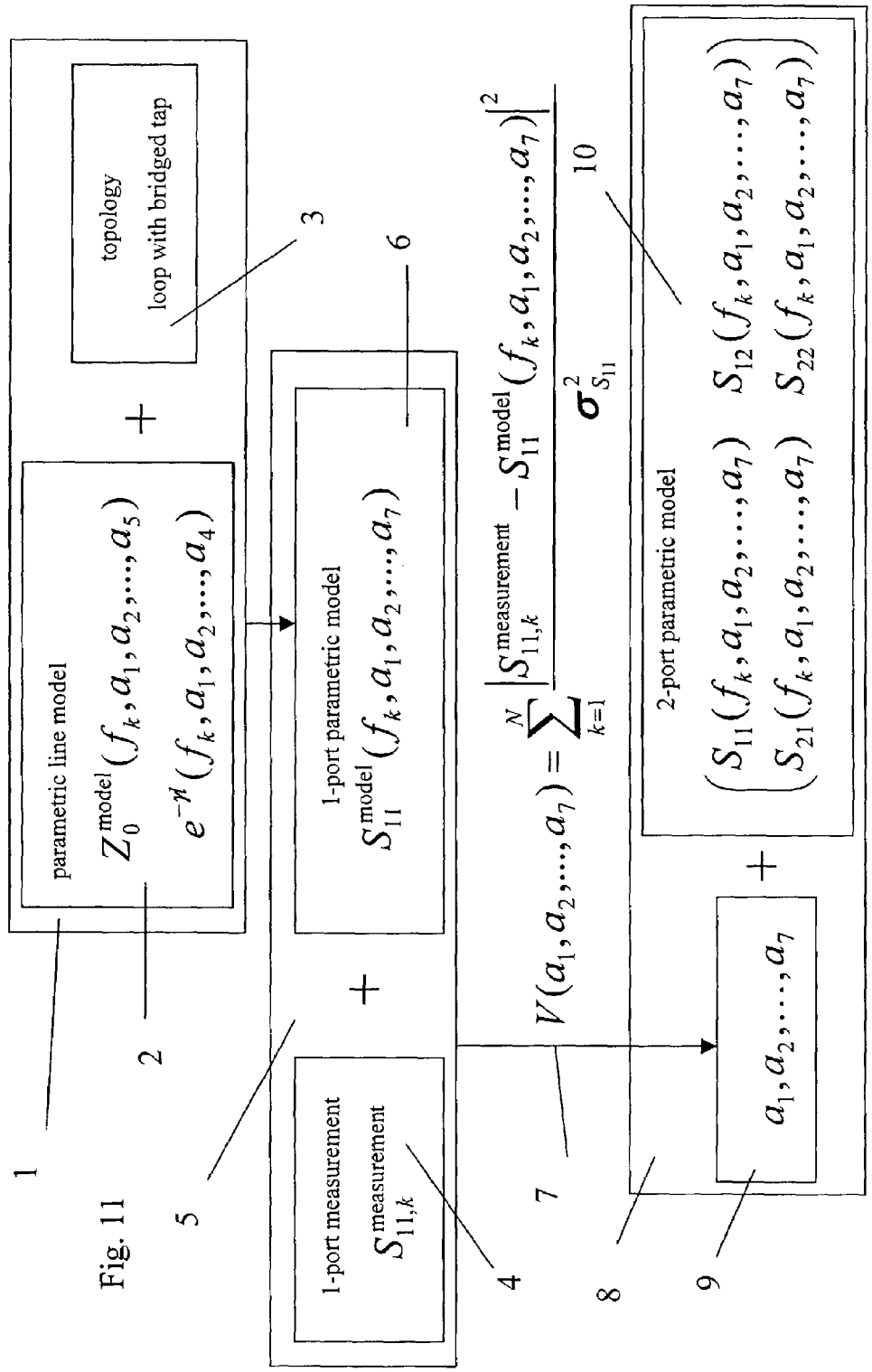
FIG. 11 is a schematic representation of a method flow diagram of an embodiment of the present invention.

A basic methodology in accordance with the present invention will be described with reference to FIG. 11. Firstly a 1-port parametric model 2 having a finite number of coefficients whose values need to be optimised is generated in step 1 for a network based on an actual or assumed topology 3 for the network. Then a 1-port measurement 4 is carried out in step 5 on the network to be analysed. For example, a measurement of the scattering parameter $S_{11}$ may be carried out, but the present invention is not limited thereto—the input impedance Zin could equally well be used. This measurement is used to do the parameter optimisation of the 1-port model 6 of the network in step 7. Then these estimated parameters 9 can be included within a 2-port parametric model 10 for the access network based on a transmission line model for every line segment to compute the estimated transfer function H in step 8. For the purposes of validation only this end-to-end transfer function can be validated with the measured transfer function (see later) and the transfer function estimated directly via the transfer function measurement, however, this is only for validation purposes.

The present invention is not limited to access networks of telephone networks, it can be used for any medium used for transmission where there is a transmitter—medium—receiver structure. To identify the medium, 1 port measurements at transmitter or receiver side can be made and these used to optimize a parametric 1-port model for the medium. The parametric model preferably has a limited set of parameters. The parameters of the transmission medium model are optimised and then used to determine a 2-port model for the network. The transmission medium could be any one suitable for a communications system, e.g. a network of twisted pair lines, coaxial lines, optical fibers, the air interface of a mobile telecommunications network.

1.1 Models

In accordance with embodiments of the present invention a transmission line or a combination or network of transmission lines is modelled by a parametric model having a finite number of coefficients to be determined, e.g. 5 coefficients $a_1$ to $a_5$ for each "basic transmission line" or transmission line primitive. Such a transmission line primitive can comprise a twisted pair cable such as is used conventionally for the local loop of a public telephone system or, for instance, a twisted pair connection between two network devices on a Local Area Network. To model a network of transmission lines, each transmission line primitive is represented by the above parametric model—that is the network is modeled by a set of individual parametric models, one of each transmission line primitive and each having a finite number of coefficients to be determined. Some of the coefficients (e.g. $a_1$ to $a_5$) may be estimated initially by calculating an initial value based on characteristics of the relevant transmission line, e.g. physical constants of materials used in the connecting cable forming the transmission line. Other coefficients may be selected, e.g. $a_4$, however it is preferred if these coefficients are also determined so as to bring the initial model close to the optimized one. Knowledge of the actual topology of the network or of a finite number of topologies which the network may have can be used to set up the parametric model.

In a further step the reflectogram of the network is measured experimentally from one access point or "port" of the network. To record the reflectogram a suitable test wave or pulse is entered at the relevant port and reflected waves measured at the port. This reflectogram is preferably stored in a manner that allows manipulation of the reflectogram within a digital computing device, e.g. the reflectogram may be converted to digital signals using an analogue to digital converter. In a next step the finite number of coefficients of the parametric model are optimized so as to give a close (or at least a closer fit than the initial values) between a characteristic of the network as modeled and the reflectogram. This comparison may be done in the time domain or the frequency domain. In the following only a comparison in the frequency domain will be described. For example, an optimization routine may be used to optimize the coefficients of the parametric model. The optimization may be done with respect to a cost function. That is, the goodness of fit between the reflectogram and the results predicted by the parametric model (e.g. a difference) may be represented as a quantitative value, and the coefficients may be optimized with reference to this value. For instance, this value may be maximized or minimized depending on whether the chosen value is a large or small value, respectively when there is a good fit.

One problem with such an optimization is that the routine may stop in a local minimum or maximum and not an absolute one. To avoid or reduce the frequency of this problem the present invention makes use of a quasi-realistic model of the network so that there is some correlation between at least certain coefficients of the parametric model and physical constants of the network. By this means at least some of initial values of the parameters should be close to their final optimized ones and therefore there is less chance that the optimization routine lands in a local minimum. This is a significant advantage of the present invention compared with fully heuristic or pragmatic models for which initial values cannot be calculated reliably from network materials and topologies.

Finally, the optimized parameters may be used in a 2-port parametric model of the network to determine crosstalk-related parameters as explained above.

In the following, a non-limiting number of models of useful topologies for local loops of telephone systems will be described.

A. Transfer Function H and Characteristic Impedance $Z_0$ for an Unshielded Twisted Pair (UTP) Transmission Line The following equations may be used for describing a basic parametric model in accordance with an embodiment of the present invention for an unshielded twisted pair transmission line. This basic parametric model will be used to construct more complex models of networks which can be described by a combination of basic parametric models.

$$\gamma l = \sqrt{z_s y_p l^2} = \sqrt{a_4 s^2 + a_1 s \sqrt{-s} \frac{J_0}{J_1} + \frac{a_1 a_3}{2} s^2 \Psi} \quad (3)$$

which represents the propagation constant of the line times its length.

$$\Psi = \frac{3 a_2^3 J_3 J_2 + 2 a_2 J_1 J_2 + a_2^2 J_0 J_3}{a_2^3 J_2 J_3 + a_2 J_1 J_2 + 3 a_2^2 J_0 J_3 + J_0 J_1} \quad (4)$$

which defines an auxiliary function used in the calculations.

$$J_i = J_i(a_3 \sqrt{-s}) \text{ with } i=0,1,2,3 \text{ (}J=\text{Bessel function)} \quad (5)$$

$$H = e^{-\gamma l} \quad (6)$$

which represents the transfer function of a primitive transmission line section $$y_p l = \alpha_5 s \quad (7)$$

where $y_p$ represents the parallel per-unit length admittance of the transmission line $$Z_0 = \frac{\gamma l}{y_p l} \quad (8)$$

where $Z_0$ represents the characteristic impedance of the line

In this model there are five coefficients which need to be optimized with respect to a measured reflectogram. The coefficients to be determined ($a_1$ to $a_5$) may be given initial values in accordance with:

$$a_1 = \frac{1}{a\pi} \sqrt{\frac{\mu}{\sigma} C l^2} \quad (9)$$

$$a_2 = \left(\frac{a}{D}\right)^2 \quad (10)$$

$$\alpha_2 = \sqrt{\mu\sigma} \quad (11)$$

$$a_4 = \frac{a_1 a_3}{\ln(1/\sqrt{a_2})}$$

The initial value of $a_4$ is preferably chosen as a combination of initial values of $a_1$, $a_2$, and $a_3$ as explained in ref. 1 which is incorporated herewith by reference.

$$\alpha_5 = C l \quad (12)$$

By introducing parameter $a_4$ no reliance should be placed on the physical meaning of the parameters. However the initial values of the parameters should still preferably have the order of magnitude predicted by the formulas above so that the parametric model optimization is more likely to determine an absolute minimum and not a local minimum.

This transmission line model for the twisted pair is based on electromagnetic theory, so it is physical, white-box model (as opposed to black box), that contains as much a priori knowledge as possible. The model includes the skin effect and proximity effect (up to 2 terms of the series solution) and is considered to be suitable for the best mode of operation of the present invention for twisted pair cables. The present invention is not however, limited to this method.

B. Scattering Parameters$_{11}$ and Transfer Function H of the Access Network

In the following the use of the basic parametric model will be described with reference to a limited number of useful network topologies.

1) Single Line

FIG. 1 depicts an equivalent electrical circuit of an access network consisting of a single line. Initial values of five parameters, $\alpha_1$ $\alpha_2$ $\alpha_3$ $\alpha_4$ $\alpha_5$, of the basic parametric model need to be determined and then optimized. The aim of the modelling exercise is to obtain an expression for $S_{11}$ (1-port model, used for the parameter estimation) and H, the transfer function (2-port model, needed for capacity estimation and validation).

$$\rho_g = \frac{Z_g - Z_{01}}{Z_g + Z_{01}} \quad (13)$$

$$\rho_1 = \frac{Z_1 - Z_0}{Z_1 + Z_0} \quad (14)$$

$$V_1^\pm = \frac{V_1 \pm Z_{refl} I_1}{2} \text{ with } i = 1, 2 \quad (15)$$

Treating the transmission line as a single port results in:
$Z_l = \infty$, $\rho_l = 1$, (assumption of an open-circuited end of the transmission line, e.g. at the customer premises of a local loop)
$Z_{refl} = Z_g = 100\ \Omega$ The following equation defines for a 1-port model the scattering parameter $S_{11}$:

$$S_{11} = \frac{V_1^-}{V_1^+}\bigg|_{V_2^+=0} \quad (16)$$

$$S_{11} = \frac{-\rho_g + e^{-2\gamma l}}{1-\rho_g e^{-2\gamma l}} \quad (17)$$

$$H = \frac{V_2}{V_1} \quad (18)$$

$Z_g = 0, \rho_g = -1, \tau_g = 2$ $$H = \frac{\tau_l e^{-\gamma l}}{1 + \rho_l e^{-2\gamma l}} \quad (19)$$

The transfer function under consideration starts at the beginning of the line and ends at the load (no generator), the transmit PSD (power spectral density) mask is defined at the location of V1 in FIG. 1, not at the location of Vg.

2) Homogeneous Loop with 1 Bridged Tap

Figure 2:
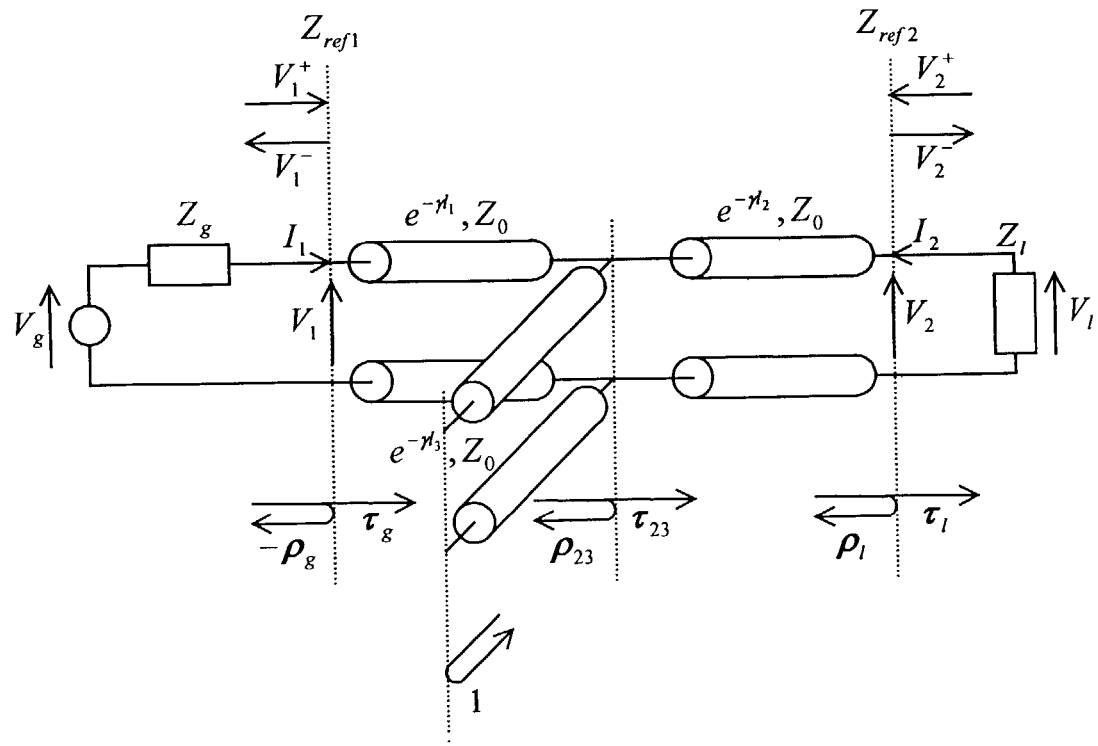
FIG. 2 shows a transmission line model of a bridge tapped loop.

FIG. 2 depicts an equivalent electrical circuit of an access network consisting of a loop with a bridge tap. Initial values of seven parameters, $\alpha_1\ \alpha_2\ \alpha_3\ \alpha_4\ \alpha_5\ \alpha_6\ \alpha_7$ of the parametric model need to be determined and then optimized. The aim of the modeling exercise is to obtain an expression for $S_{11}$, the scattering function and H, the transfer function.

$$a_6 = \frac{l_2}{l_1} \quad (20)$$

$$a_6 = \frac{l_3}{l_1} \quad (21)$$

$Z_l = \infty, \rho_l = 1$, (assumption open-circuit at the end)

The following equation defines for a 1-port model the scattering parameter $S_{11}$:

$$S_{11} = \frac{\begin{array}{c}-3\rho_g - e^{-2\gamma l_1} - \rho_g e^{-2\gamma l_2} - \rho_g e^{-2\gamma l_3} + e^{-2\gamma(l_1+l_2)} + \\ e^{-2\gamma(l_1+l_3)} + \rho_g e^{-2\gamma(l_2+l_3)} + 3e^{-2\gamma(l_1+l_2+l_3)}\end{array}}{\begin{array}{c}3 + \rho_g e^{-2\gamma l_1} + e^{-2\gamma l_2} + e^{-2\gamma l_3} - \rho_g e^{-2\gamma(l_1+l_2)} - \\ \rho_g e^{-2\gamma(l_1+l_3)} - e^{-2\gamma(l_2+l_3)} - 3\rho_g e^{-2\gamma(l_1+l_2+l_3)}\end{array}} \quad (22)$$

$Z_g = 0, \rho_g = -1, \tau_g = 2$ (assumption PSD mask defined at $V_1$)

2-port model: transfer function H $$H = \frac{2\tau_l(e^{-\gamma(l_1+l_2)} + e^{-\gamma(l_1+l_2+2l_3)})}{\begin{array}{c}3 - e^{-2\gamma l_1} + \rho_l e^{-2\gamma l_2} + e^{-2\gamma l_3} + \rho_l e^{-2\gamma(l_1+l_2)} + \\ e^{-2\gamma(l_1+l_3)} - \rho_l e^{-2\gamma(l_2+l_3)} + 3\rho_l e^{-2\gamma(l_1+l_2+2l_3)}\end{array}} \quad (23)$$

3. Cascade of 2 Line Sections

Figure 3:
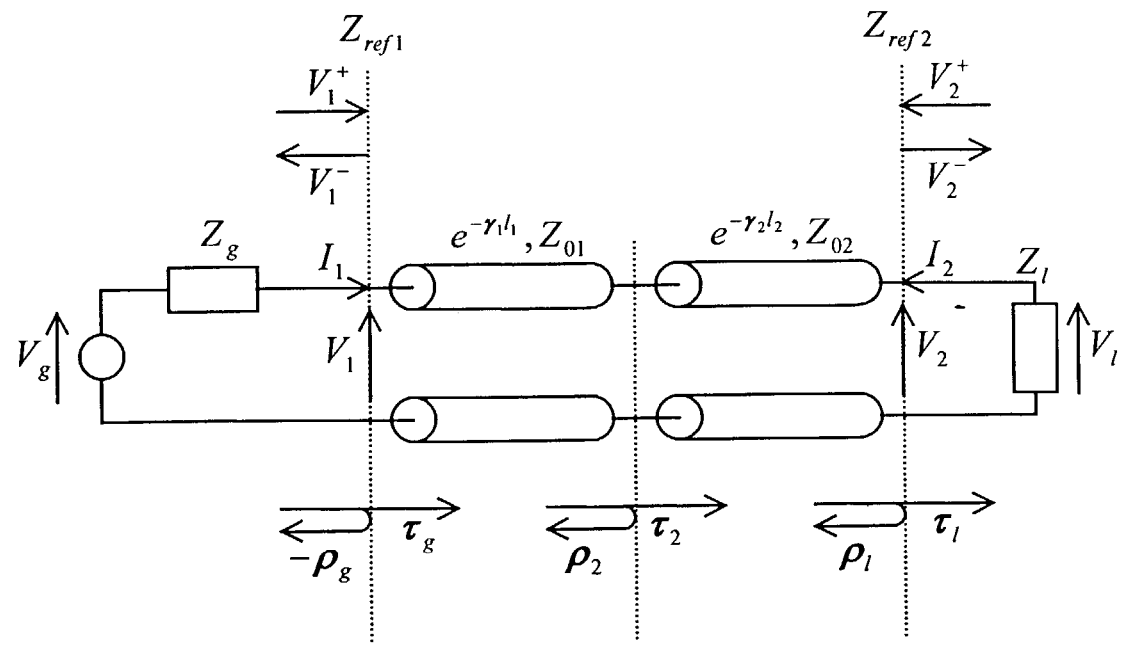
FIG. 3 shows a transmission line model of a loop of two cascaded lines.

FIG. 3 depicts an equivalent electrical circuit of an access network consisting of a cascade of two lines. Initial values of ten parameters $\alpha_{11}\ \alpha_{21}\ \alpha_{31}\ \alpha_{41}\ \alpha_{51}\ \alpha_{12}\ \alpha_{22}\ \alpha_{32}\ \alpha_{42}\ \alpha_{52}$ of the parametric model need to be determined and then optimized. The aim of the modeling exercise is to obtain an expression for $S_{11}$, the scattering function and H, the transfer function.

$Z_l = \infty, \rho_l = 1$, (assumption open-circuit at the end)

$$S_{11} = \frac{-\rho_g + \rho_2 e^{-2\gamma_1 l_1} - \rho_g \rho_2 e^{-2\gamma_2 l_2} + e^{-2(\gamma_1 l_1 + \gamma_2 l_2)}}{1 - \rho_g \rho_2 e^{-2\gamma_1 l_1} + \rho_2 e^{-2\gamma_2 l_2} - \rho_g e^{-2(\gamma_1 l_1 + \gamma_2 l_2)}} \quad (24)$$

$Z_g = 0, \rho_g = -1, \tau_g = 2$ $$H = \frac{\tau_2 \tau_l e^{-(\gamma_1 l_1 + \gamma_2 l_2)}}{1 + \rho_2 e^{-2\gamma_1 l_1} + \rho_2 \rho_1 e^{-2\gamma_2 l_2} + \rho_1 e^{-2(\gamma_1 l_1 + \gamma_2 l_2)}} \quad (25)$$

1.2 Estimators

C. Cost Function

In the following one cost function will be described for use in optimizing the parameters of the parametric model, but the present invention is not limited thereto. It is called maximum likelihood for the output error model. This type of cost function has useful properties such as the fact that estimated parameters are not biased, $$V(\theta_1, \ldots, \theta_N) = \sum_{k=1}^{M} \frac{|S_{11}^{model}(f_k, \theta_1, \ldots, \theta_N) - S_{11,k}^{measurement}|^2}{\sigma_{S_{11},k}^2} \quad (26)$$

M=number of frequency samples

N=number of parameters

This first cost function in $S_{11}$ is important for the general method in accordance with the present invention.

D. Minimizer

The optimization of parameters is carried out by minimizing a difference represented by the cost function. The preferred minimizer is from Levenberg-Marquardt but the present invention is not limited to this type of optimization algorithm, nor to any particular values for the starting values.

As an example, the following starting values may be selected:

α=0.25×10$^{-3}$ mm

D=1×10$^{-3}$ mm

σ=5.8×10$^7$ S/m assumed for copper conductors.

μ=μ$_0$ for PE insulated cables

∈=2.26∈$_0$ for PE insulated cables

Lext=mu/(2*pi)*log(D^2/radius^2);

C=1/Lext*epsilon*mu;

The minimum of the cost function as a function of the model parameters may be found by means of an iterative optimization algorithm. There is a large variety of optimization routines available which are known to the skilled person. The Levenberg-Marquardt (LM) method is one of the preferred ones. It combines the Gauss-Newton and gradient descent procedures. The Gauss-Newton method is fast, because it makes use of second-order derivatives, but it does not always converge. This problem of convergence is solved in the Levenberg-Marquardt algorithm by addition of the gradient descent method. The Levenberg-Marquardt algorithm only searches for a local minimum. In order to find the global minimum, the initial values of the model parameters have to be close enough to the exact values, which correspond to the global minimum of the cost function. In accordance with an aspect of the present invention achieving the absolute minimum of the cost function is assisted by selecting a parametric model which is at least quasi-realistic so that reliable initial values for at least some of the coefficients can be estimated. Preferably, the parametric model should be chosen such that a majority of the coefficients (more than 50%, more preferably 60% or more and most preferably 70% or more) can be estimated based on physical characteristics of the network to be qualified.

1.3 Measurements

E. Measurement Setup

These are the settings used for the network analyzer measurements for determining H.

In the measurement step the reflectogram of the network is measured for a specific excitation signal. A Hewlett Packard Network Analyzer type HP4195A was used with a start frequency of 3*4.3125=12.9375 kHz (tone 3) and a stop frequency of 1.104000 MHz (tone 256). The RBW was 100 Hz, sweep time 2 min, and 401 points were recorded. Four measurements were performed of $S_{11}$ and H in each case to be able compute mean and variance values. These latter values are used as weighting factors in the MLE cost function (see equation 26)

The transmission lines used were cables, e.g. as supplied by Belgacom (Belgium), having a conductor diameter of 0.5 mm, a PE insulation, and 20 pairs in the form of quads; as supplied by BT (UK), having a conductor size of 0.5 mm, insulation of PE, 20 pairs; as supplied by FT (France), having conductor size of 0.4 mm, PE insulation, 8 pairs, quads. the North Hill balance was 50 Ohm to 135 Ohm F. Results Only the magnitude is shown, although the phase has been estimated as well. The magnitude is however most important for the capacity estimation The results are shown for 3 topologies, but the patent is not limited to these 3 topologies.

Figure 4:
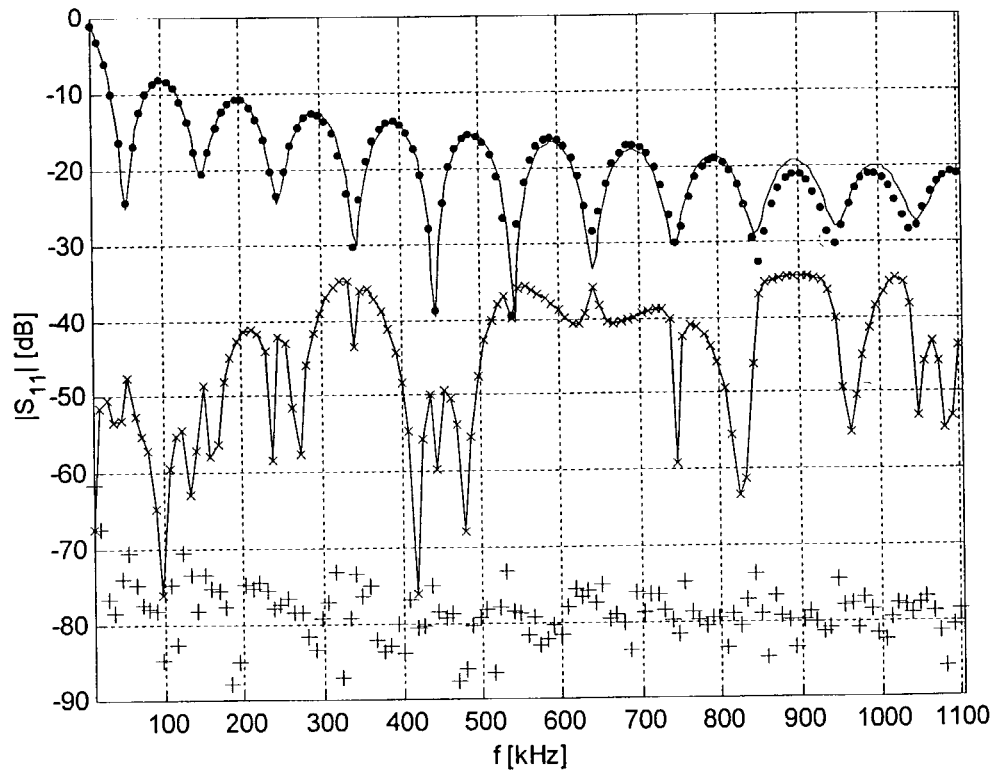
FIG. 4 shows measurements and estimated values of the scattering parameter $S_{11}$ versus frequency using embodiments of the present invention for a single line.
Figure 6:
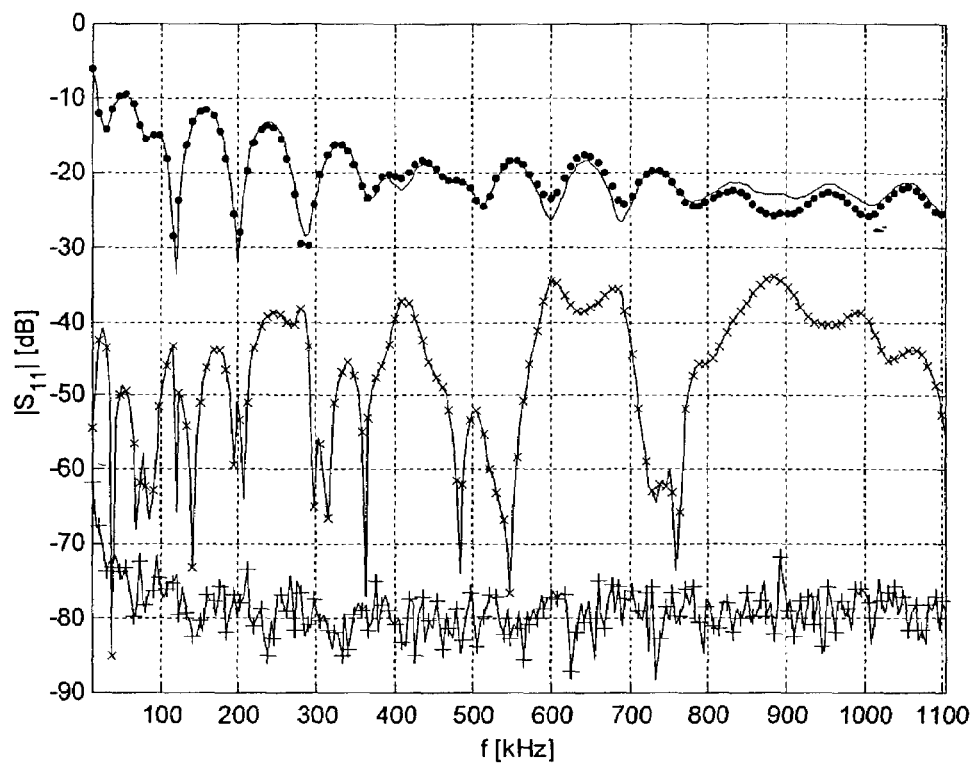
FIG. 6 shows measurements and estimated values of the scattering parameter $S_{11}$ versus frequency using embodiments of the present invention for two cascaded lines.
Figure 8:
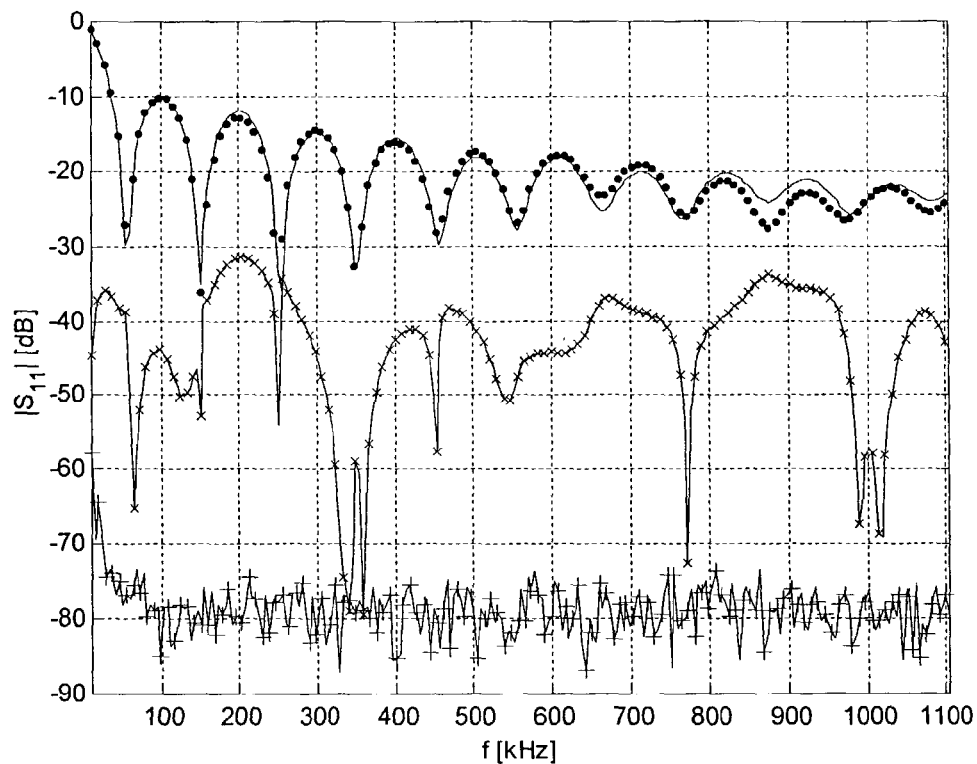
FIG. 8 shows measurements and estimated values of the scattering parameter $S_{11}$ versus frequency using embodiments of the present invention for a bridge tapped line.

LEGEND for graphs in FIGS. 4, 6, 8 showing $S_{11}$ on the y axis is:
. (dotted): measured values as shown in upper portion of figures
- (full line): estimation as shown in upper portion of figures
-x- (full line, x): error as shown in the middle of the figures
-+- (full line for FIGS. 6 and 8 only, +): 95% confidence bound as shown in lower portion of the figures Remark: in the case that there are only stochastic errors present, the error should be below the 95% confidence bound. Where this not the case this means that there are model errors present.

Figure 5:
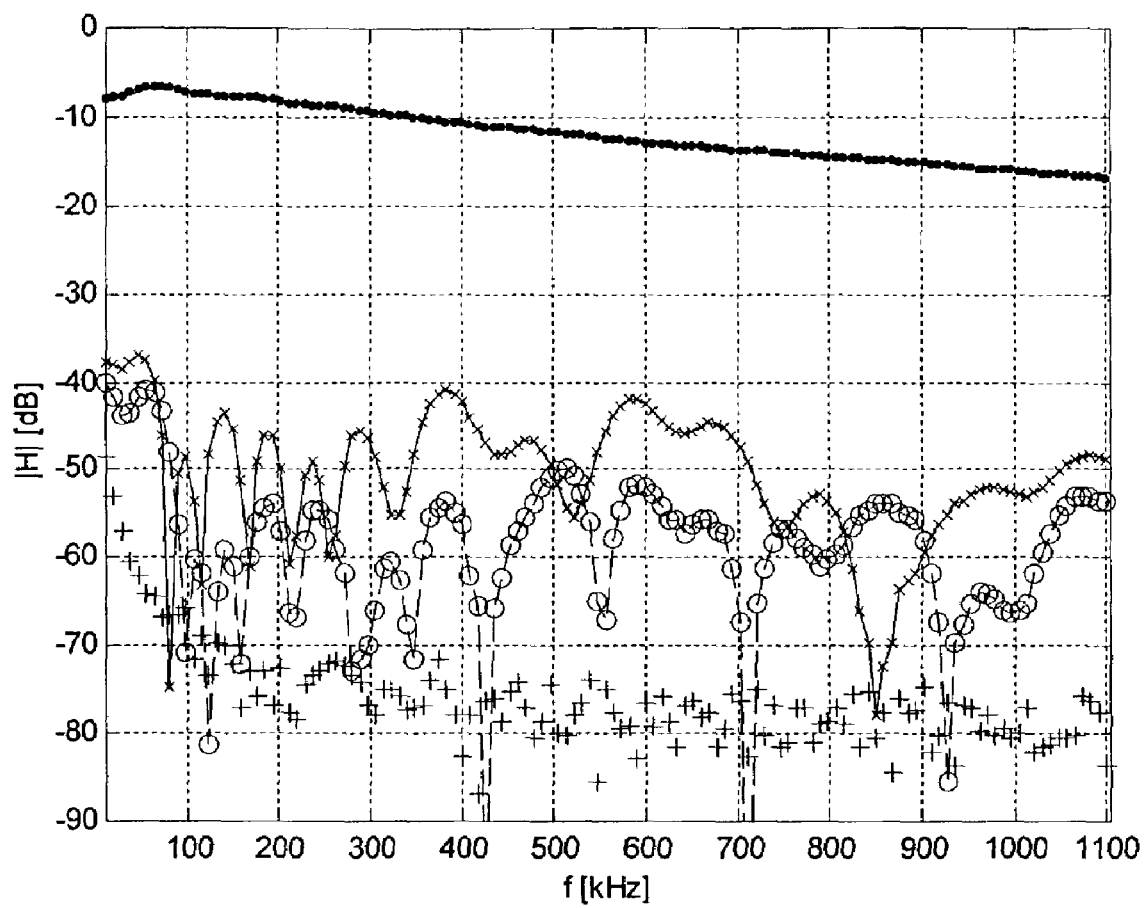
FIG. 5 shows measurements and estimated values of the transfer function H versus frequency using embodiments of the present invention for a single line.
Figure 7:
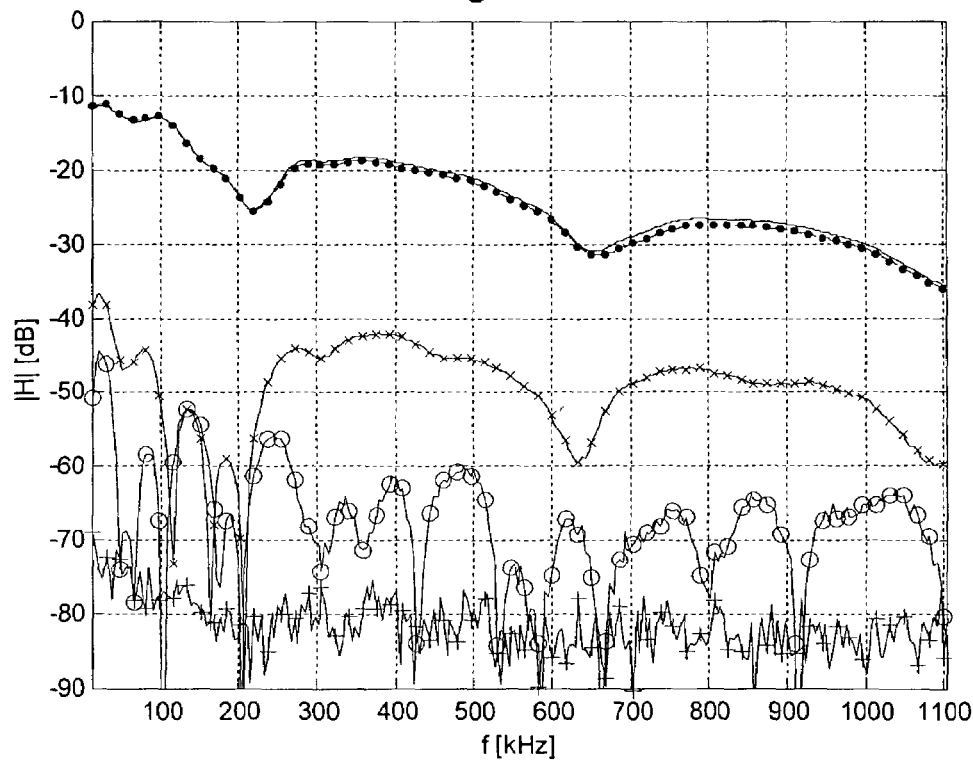
FIG. 7 shows measurements and estimated values of the transfer function H versus frequency using embodiments of the present invention for two cascaded lines.
Figure 9:
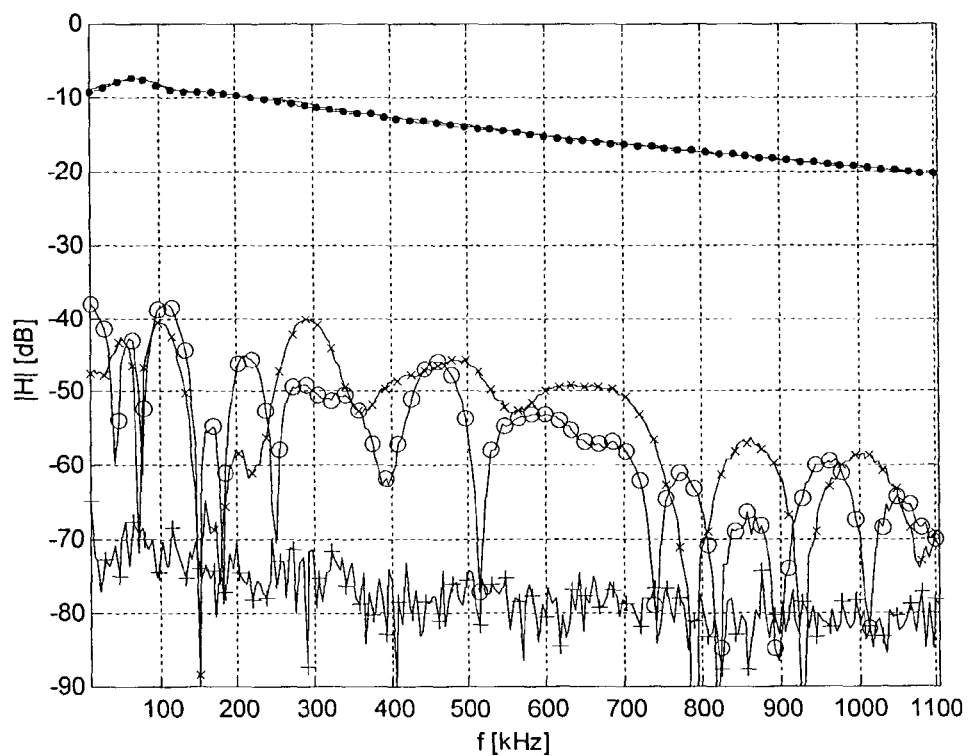
FIG. 9 shows measurements and estimated values of the transfer function H versus frequency using embodiments of the present invention for a bridge tapped line.

LEGEND for graphs in FIG. 5, 7, 9 having H as the y axis is:
. (dotted): measured values as shown in upper portion of figures
- (full line): estimation via $S_{11}$ (generally so close to the dots that it cannot be distinguished from these at this scale)
-- (dashed line in FIGS. 7 and 9): estimation via H (generally so close to the dots that it cannot be distinguished from these at this scale)
-x- (full line, x): error in the estimation via $S_{11}$ in the middle of the figures
-o- (dashed line in FIG. 5, full line in FIGS. 7 and 9, o): error in the estimation via H in the middle of the figures
-+- (full line only in FIGS. 7 and 9, +): 95% confidence bound in the lower portion of the figures 1) Single Line In FIG. 4 the results for the scattering factor $S_{11}$, both model and measurement and in FIG. 5 for the transfer function H for a single line, both measurement and model are shown.

2) Loop with a Bridged Tap

In FIG. 6 the results for the scattering factor $S_{11}$, both model and measurement and in FIG. 7 for the transfer function H, both measurement and model are shown.

All segments of cable were BT cable with conductor size of 0.5 mm, first segment was 900 m, second segment 700 m and bridged tap 200 m.

3) Cascade of 2 Lines

In FIG. 8 the results for the scattering factor $S_{11}$, both model and measurement and in FIG. 9 for the transfer function H, both measurement and model are shown.

A BT cable of 500 m and conductor size 0.5 mm was cascaded with an FT cable of 400 m with a conductor size of 0.4 mm.

For all the 3 topologies it is clear that the 3 transfer functions (measured, estimated via 1-port measurement $S_{11}$, estimated via a 2-port measurement H) match very well.

2. Two Port Method of Determining the Transfer Function

A further embodiment of the present invention which is a preferred best mode operation of the invention determines the transfer function using a two-port measurement technique. Particularly, preferred is the measurement at the receiver of standard tones transmitted along the transmission line. The ITU standards G.9992.1 for asymmetric digital subscriber line transceivers and G.9994.1 for handshake procedures for asymmetric digital subscriber line transceivers describe initialization routines which require the transmission of periodic signals for channel analysis. This channel analysis may include determination of the transfer function. This directly determined transfer function is then used to determine an optimised model for the transmission line without requiring prior knowledge as to this topology.

2.2 Models

The same parametric models are used as described in section 1.1 except that now the transfer function has been measured directly and so the model must be optimised based on these measurements and not on the scattering function determined from a reflectogram. In particular, the transfer function as defined in equations 19, 23 and 25 are used for the optimisation procedure.

2.3 Estimators

The same estimators are used as in section 1.3 above except that equation 26 has to be modified to optimise on the measured transfer function:

$$V(\theta_1, \ldots, \theta_N) = \sum_{k=1}^{N} \frac{|H^{model}(f_k, \theta_1, \ldots, \theta_N) - H_k^{measurement}|^2}{\sigma_{H,k}^2} \quad (27)$$

The line lengths and the topology are assumed unknown and the optimisation procedure is used to select a model which gives the best fit as well as providing the length of this line topology. Other details of the estimation step are as described in section 1.3.

2.4 Measurements

A single line of 1500 meters and a homogeneous bridged tap network (section lengths of 900, 600 and 100 meters) were used (cable type 0.5 mm). The transfer function was measured using tones at different frequencies only in the downstream band of VDSL. The minimised cost functions are shown in table 1.

TABLE 1

Minimised Cost functions

| Estimator: | Measurement | |
|---|---|---|
| | Single Line | Tap |
| Single line | 9.1e12 | 7.6e14 |
| Tap | 5.8e14 | 2.3e13 |

From the table the minimum values of the cost functions identify the relevant topology accurately. The estimated lengths were 1500.63 meters for the single line and 900.88/600.56/99.94 for the tap lengths. The agreement is excellent confirming the model.

Figure 12:
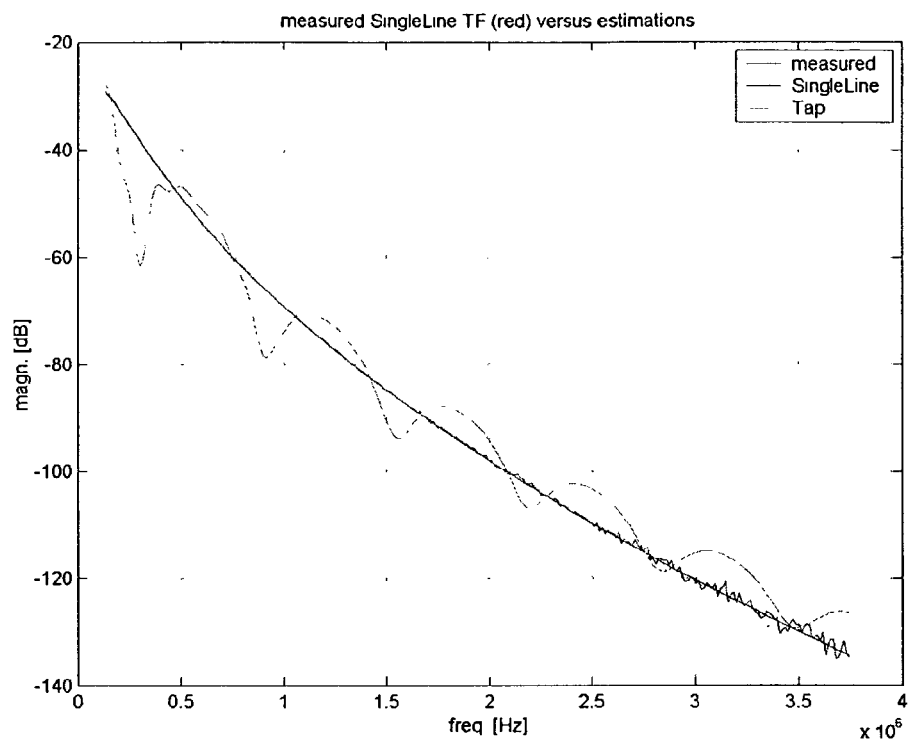
FIG. 12 shows measurements and estimated values of the transfer function TF versus frequency using embodiments of the present invention for a single line.
Figure 13:
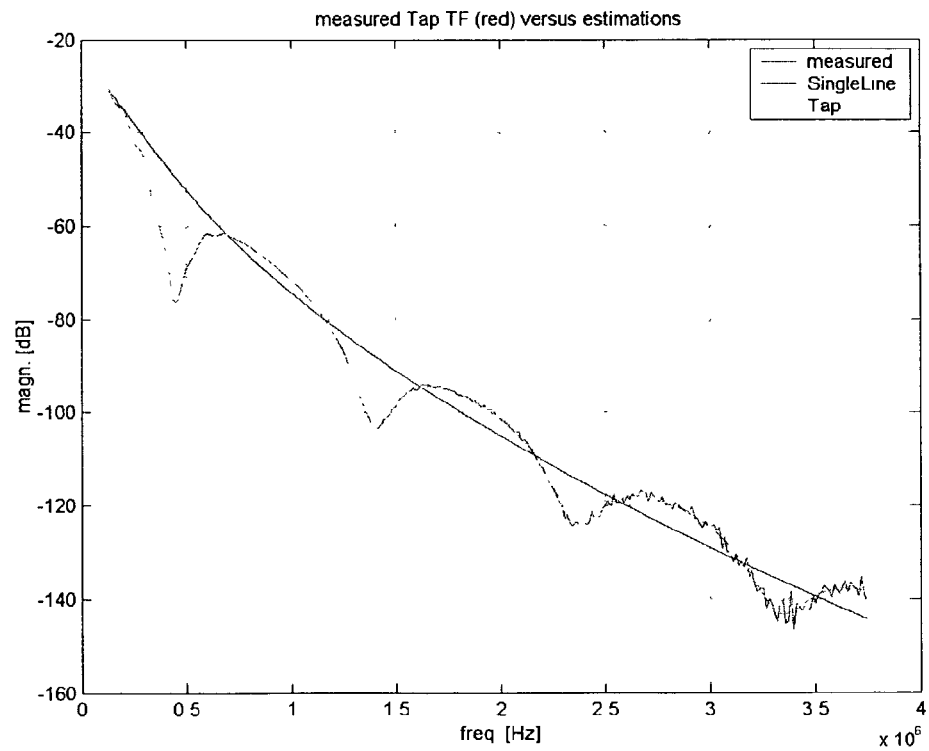
FIG. 13 shows measurements and estimated values of the transfer function TF versus frequency using embodiments of the present invention for a bridge tapped line

A comparison of the estimated and measured transfer functions for the single line and the tap is given in FIGS. 12 and 13 respectively.

3. Estimation of Crosstalk Related Parameters

Figure 14:
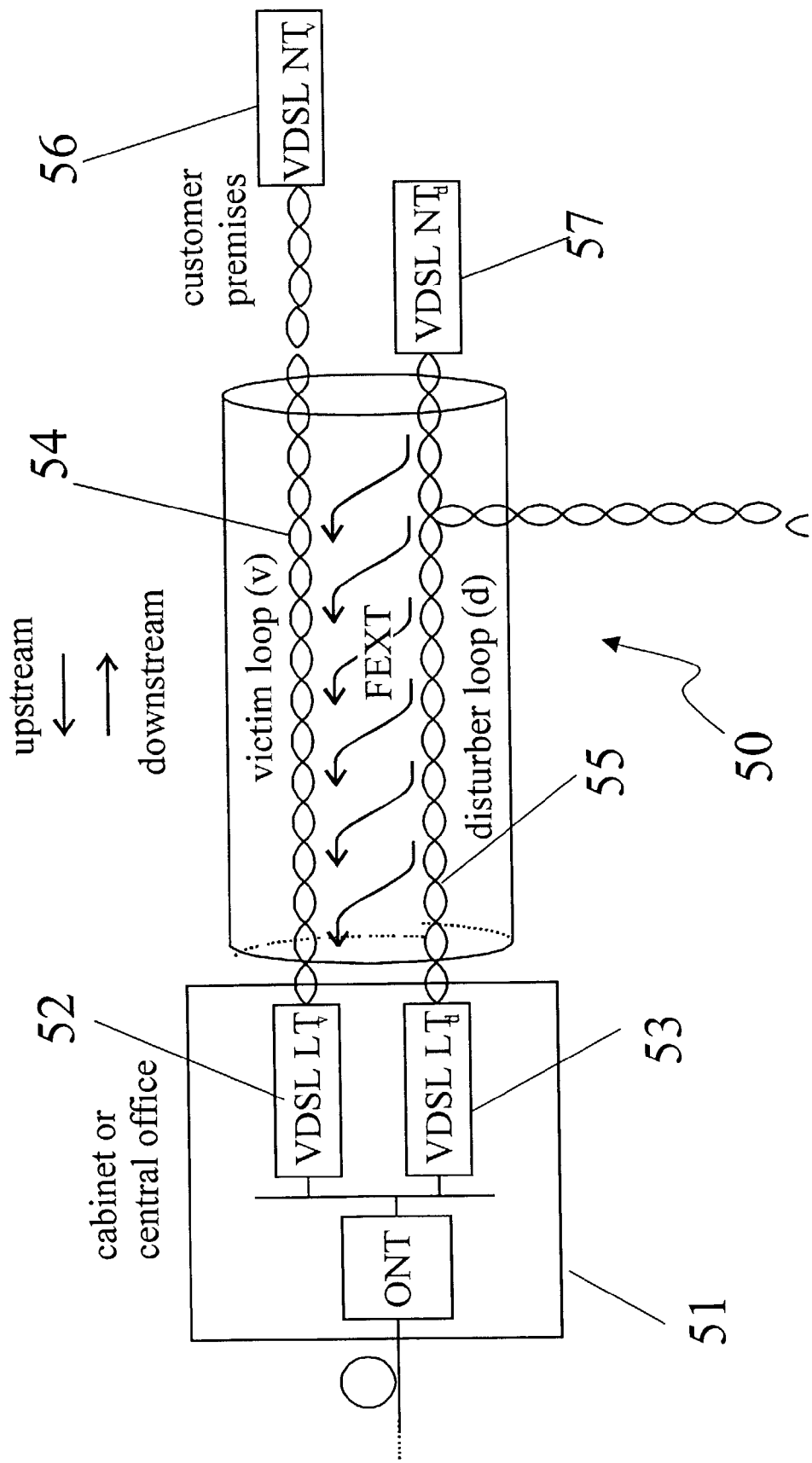
FIG. 14 is a schematic representation of a network showing FEXT interference on a victim line from a disturber line.

FIG. 14 is a schematic diagram for describing the methods in accordance with the present invention for estimating at least one crosstalk related parameter of the network. A network 50 has a central office 51 comprising a plurality of VDSL transceivers 52, 53 feeding transmission lines 54, 55. At the customers premises transceivers 56, 57 terminate the transmission lines 54, 55. FEXT from a disturber loop 55 (in the following equation the subscript d relates to the disturber loop) accumulates in a victim loop 54 (in the following equations in the subscript v relates to the victim loop). It is not a requirement of the present invention that loops 54, 55 are the same length. Each transmission line 54, 55 will be considered as a pair of twisted cables but the present invention is not limited thereto. There is capacitive and inductive coupling between the wires of this 4-conductor transmission line.

Once the topology and length of the loop has been determined by any of the above methods, the parameters of the chosen model can be used in a model of crosstalk related parameters such as FEXT. In the following the calculation result is an unbalance function for FEXT CF and NEXT CN. Notation in the formulas is consistent with the notation in G. A. Campbell, "Dr. Campbell's Memoranda of 1907 and 1912", The Bell System technical Journal, vol.14, no. 4, pages 553-573, October 1935; H. Carvis and T. V. Crater, "Engineering of T1 Carrier System Repeated Lines", The Bell System technical Journal, vol. 42, no. 42, pages 431 - 486, March 1963; A. J. Gibbs and R. Addie, "The Covariance of near End crosstalk and its application to PCM System Engineering in multipair cable", IEEE trans. Comm. vol. 27, no.2, pages 469-477, February 1979.

Figure 15:
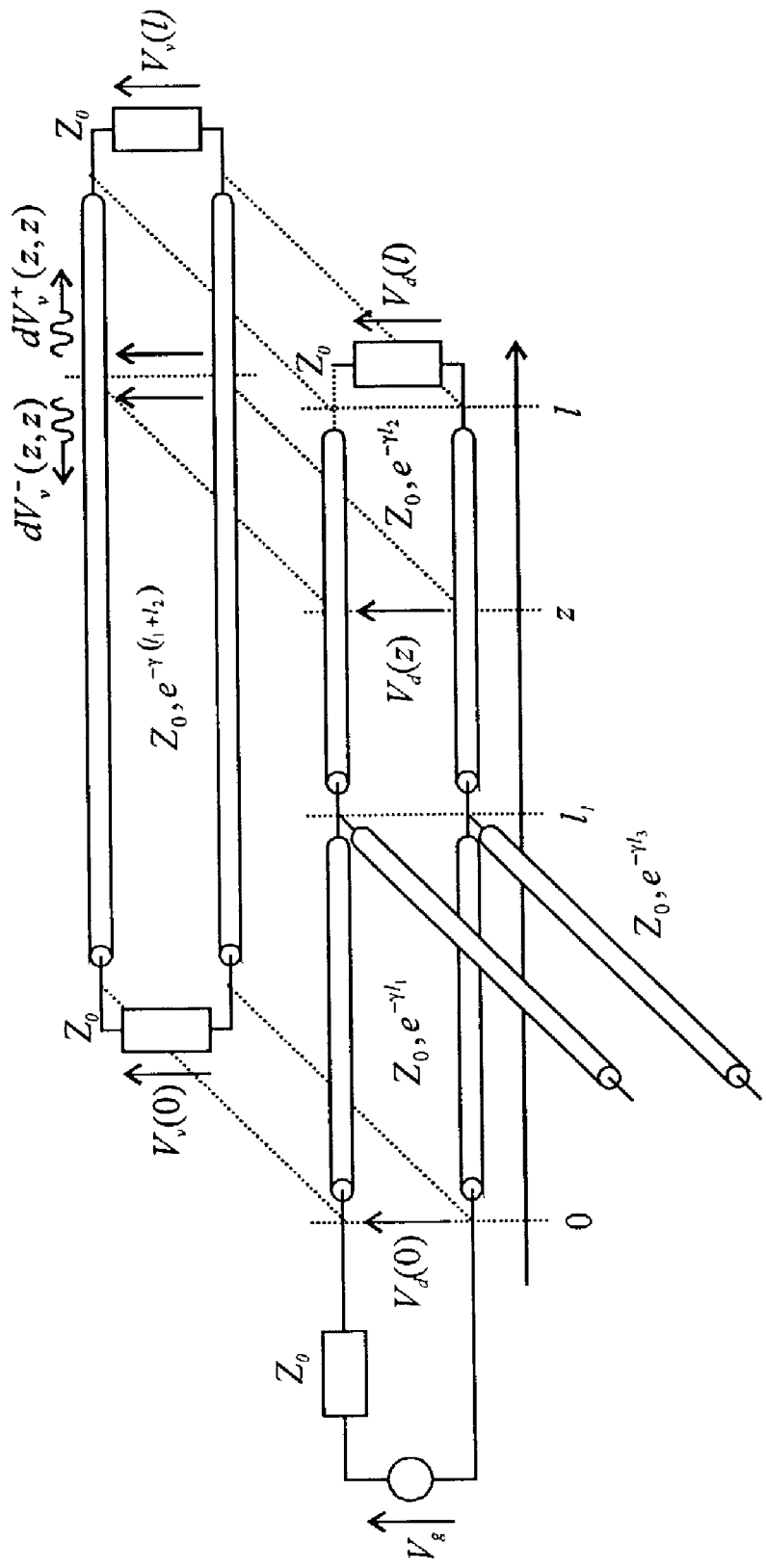
FIG. 15 is a schematic representation of a part of a network comprising a victim and a disturber loop.

FIG. 15 depicts the coupling between the disturber and the victim loop. The generator has a voltage $V_g$ and internal impedance $Z_g = Z_0$, with $Z_0$ being the characteristic impedance of the loop. The disturber loop has 1 bridged tap and hence consists of three line sections. All line sections have the same characteristic impedance and propagation constant. the line lengths are $l_1$, $l_2$ and $l_3$. The corresponding transfer functions are $e^{-l_1}$, $e^{-l_2}$ and $e^{-l_3}$. The line is terminated in the characteristic impedance. For simplicity certain assumptions may be made in the model about $C_F(Z)$ and $C_N(Z)$:

1. real and constant (independent of frequency)
2. stochastic variables normally distributed
3. $E[C_F(Z)] = 0$
4. $E[C_F(Z)C_F(Z')] = k_F \delta(z-z')$ The calculation of the power FEXT transfer function (for a certain pair-pair combination) is as follows.

The expectation value of the FEXT power transfer function in dependence on the constants $k_F$, $k_N$ and $k_{FN}$ is given by:

$$E[|X_F|^2 \mid k_F, k_N, k_{FN}] = \frac{\omega^2 e^{-2\alpha l}}{16[9 + 6e^{-2\alpha l_3}\cos(2\beta l_3) + e^{-4\alpha l_3}]} \quad (28)$$
$$(k_F(F_1 + F_2) + k_N(F_3 + F_5) + k_{FN}(F_4 + F_6 + F_7))$$

The functions $F_1$ to $F_7$ are given by:

$$F_1 = (9 + 6e^{-2\alpha l_3}\cos(2\beta l_3) + e^{-4\alpha l_3})l_1 \quad (29)$$

$$F_2 = 4(1 + 2e^{-2\alpha l_3}\cos(2\beta l_3) + e^{-4\alpha l_3})l_2 \quad (30)$$

$$F_3 = (1 + e^{-4\alpha l_3})1 - \frac{e^{-4\alpha l_1}}{4\alpha} \quad (31)$$

$$F_4 = (-3 + e^{-\alpha l_3})[e^{-2\alpha l_1}\phi(l_1) + \alpha] \quad (32)$$

$$F_5 = -\frac{1}{2\alpha}e^{-2\alpha l_3}\cos(2\beta l_3)(1 - e^{-4\alpha l_1}) \quad (33)$$

$$F_6 = \frac{3}{\alpha^2 + \beta^2}e^{-2\alpha l_3}[e^{-2\alpha l_1}\phi(l_1 + l_3) - \phi(l_3)] \quad (34)$$

$$F_7 = -\frac{1}{\alpha^2 + \beta^2}e^{-2\alpha l_3}[e^{-2\alpha l_1}\phi(l_1 - l_3) - \phi(-l_3)] \quad (35)$$

where $$\phi(x) = -\alpha\cos(2\beta x) + \beta\sin(2\beta x) \quad (36)$$

The model described above depends upon three constants $k_F$, $k_N$ and $k_{FN}$ that are defined in the following equations.:

$$E[C_F(z)C_F(z')] = k_F \delta(z-z') \quad (37)$$

$$E[C_N(z)C_N(z')] = k_N \delta(z-z') \quad (38)$$

$$E[C_F(z)C_N(z')] = k_{FN} \delta(z-z') \quad (39)$$

These constants $k_F$, $k_N$ and $k_{FN}$ are assumed to be a priori knowledge.

The FEXT transfer function can be used to determine power back-off. The PSD of a transmitter is represented as $S_t(f)$ as a function of frequency f. This PSD is to be set so that at a receiver no more than a reference PSD $S_r(f)$ is obtained. The value of $S_t(f)$ can be determined by:

$$S_r(f) \geq E[|X_F|^2 \mid k_F, k_N, k_{FN}]S_t(f) \quad (40)$$

The value of $S_t(f)$ which guarantees conformance with equation 40 (provided it does not exceed a maximum power allowed for the transmitter) will provide a good equalised FEXT performance of the network.

4. Implementation

The present invention may be implemented on a computing device e.g. a personal computer or a work station which has an input device for loading the details of the network whose capacity is to be estimated, e.g. its topology as well as any other parameters required by the various models and methods defined above in the description as well as in the attached claims. The computing device may be in the form of a card mounted microprocessor which may plugged into a network card slot of a telecommunications network element such as the 7300 Alcatel DSL Subscriber Access Multiplexer supplied by Alcatel NV, Antwerp Belgium. The computing device is adapted to run software which carries out any of the methods in accordance with the present invention. The computer may alternatively be a server which is connected to a data communications transmission means such as the Internet, a Local Area Network or a Wide Area Network. A script file including, for example, the details of the topology of the network and/or physical constants relating to the materials used in the construction of the transmission line(s), may be sent from one near location, e.g. terminal, to a remote, i.e. second location, at which the server resides. In addition details of the reflectogram or the received results from tone measurements of transfer functions for the relevant network may be sent to the server from the same near location or from another location. The server receives all this data and carries out a method in accordance with the present invention and outputs back along the communications line useful data to a near terminal, e.g. a cross-talk related parameter.

Figure 10:
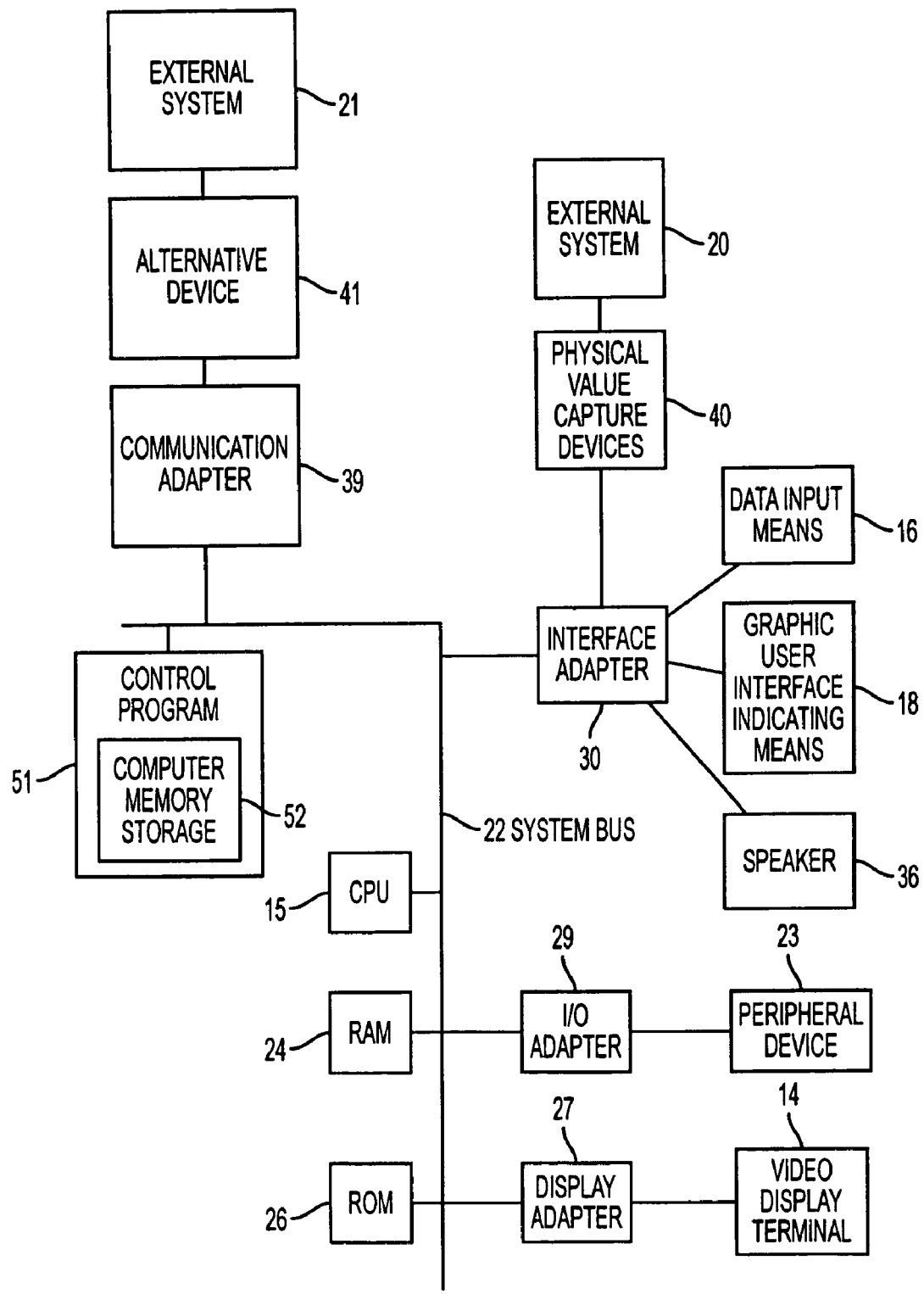
FIG. 10 is a schematic representation of a computing device which can be used with the present invention.

FIG. 10 is a schematic representation of a computing system which can be utilized in accordance with the methods and systems of the present invention. A computer 10 is depicted which may include a video display terminal 14, a data input means such as a keyboard 16, and a graphic user interface indicating means or pointer such as a mouse 18. Computer 10 may be implemented as a general purpose computer.

Computer 10 includes a Central Processing Unit ("CPU") 15, such as a conventional microprocessor of which a Pentium III processor supplied by Intel Corp. USA is only an example, and a number of other units interconnected via system bus 22. The computer 10 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 10 may further include random-access memory ("RAM") 24, read-only memory ("ROM") 26, as well as an optional display adapter 27 for connecting system bus 22 to an optional video display terminal 14, and an optional input/output (I/O) adapter 29 for connecting peripheral devices (e.g., disk and tape drives 23 such as for example a CD-ROM reader) to system bus 22. Video display terminal 14 can be the visual output of computer 10, which can be any suitable display device such as a CRT-based video display well-known in the art of computer hardware. However, with a portable or notebook-based computer, video display terminal 14 can be replaced with a LCD-based or a gas plasma-based flat-panel display. Computer 10 further includes user interface adapter 30 for connecting a keyboard 16, mouse 18, optional speaker 36, as well as allowing optional physical value inputs from physical value capture devices 40 of an external system 20. The devices 40 may be any suitable equipment for capturing physical parameters of the network or parameters of the various models required in the execution of the present invention. These capture devices may also include a stimulus and a measurement device for inputting a test wave and for measuring the response of a network or parts thereof, e.g. a reflectogram or other form of received signal. Additional or alternative devices 41 for capturing physical parameters of an additional or alternative external system 21 may also connected to bus 22 via a communication adapter 39 connecting computer 10 to a data network such as the Internet, an Intranet a Local or Wide Area network (LAN or WAN) or a CAN. The term "physical value capture device" can also includes devices which provide values of parameters of a network or networks, e.g. topologies, or for instance a library of candidate networks or candidate network topologies.

Computer 10 also includes a graphical user interface that resides within a machine-readable media to direct the operation of computer 10. Any suitable machine-readable media may retain the graphical user interface, such as a random access memory (RAM) 24, a read-only memory (ROM) 26, a magnetic diskette, magnetic tape, or optical disk (the last three being located in disk and tape drives 23). Any suitable operating system and associated graphical user interface (e.g. Microsoft Windows) may direct CPU 15. In addition, computer 10 includes a control program 51 which resides within computer memory storage 52. Control program 51 contains instructions that when executed on CPU 15 carries out the operations described with respect to the methods of the present invention. The instructions may be obtained by writing a computer program in a suitable language such as C or C++ for execution of any of the methods in accordance with the present invention and then compiling the program so that it executes on a computing device.

Those skilled in the art will appreciate that the hardware represented in FIG. 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 10, a computer program product (i.e. control program 51 for executing methods in accordance with the present invention comprising instruction means in accordance with the present invention) can reside in computer storage. The instructions (e.g., computer readable code segments in storage 52) may be read from storage into RAM 24. Execution of sequences of instructions contained in the RAM 24 causes CPU 15 to perform the process steps described herein. In alternative embodiments, hard-wired circuitry may be used in place of or in combination with software instructions to implement the invention. Thus, embodiments of the invention are not limited to any specific combination of hardware circuitry and software. Accordingly, the present invention may take the form of an entirely hardware embodiment, an entirely software embodiment or an embodiment combining software and hardware aspects.

Furthermore, the present invention may take the form of a data carrier medium. Further, another exemplary embodiment can be directed to a computer program product on a computer-readable storage medium carrying computer-readable program code segments embodied in the medium. The terms "carrier medium" and "computer-readable medium" as used herein refer to any medium that participates in providing instructions to a processor such as CPU 15 for execution. Such a medium may take many forms, including but not limited to, non-volatile media, and volatile media. Non-volatile media include, for example, optical or magnetic disks, such as a CD-ROM or a storage device which is part of mass storage. Volatile media includes dynamic memory such as RAM 24. In another embodiment, instead of a data carrier medium, an exemplary embodiment of the invention can be embodied on transmission media. Transmission media can include coaxial cables, copper wire and fiber optics, including the wires that comprise a bus within a computer, such as bus 22. In another embodiment, transmission media can also take the form of acoustic or light waves, such as those generated during radio wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge. In another exemplary embodiment, the invention can be embodied on a carrier wave as described hereafter, or any other medium from which a computer can read.

These various forms of computer readable media may be involved in carrying one or more sequences of one or more instructions to processor 15 for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

However, it is important that those skilled in the art will appreciate that the methods of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links which may be used for downloading the computer program product.

5. Method

A method in accordance with the present invention will be described with reference to a personal computer. A computer program written to carry out the methods of the present invention is started in the usual way. For instance, a pop-up message appears providing an input form for specifying the network topology to be used. Alternatively or additionally the possibility for using predefined topologies may be provided, e.g. by allowing selection from a drop-down menu. Alternatively or additionally an option may be provided when the topology is not known. In this case the program will make use of a set of predefined typical topologies and will attempt to fit a measured reflectogram to each of the models or to fit a measured transfer function to each of the models. The best fit is assumed to represent a topology which is close to the actual topology and is used for the crosstalk-related parameter calculation.

After having entered the necessary data, for example network topology, insulating and conductor materials of a twisted pair cable, conductor spacing of the cable, etc. the reflectogram or the received signals based on tome transmissions, may be entered. This may be done by loading from a peripheral device, e.g. from a CD-ROM read by a CD-ROM reader, or by downloading it from mass storage, e.g. from a server located on a LAN or via the Internet. Alternatively, the computer may be connected to a suitable reflectogram or other received signal capture device, e.g. via a USB interface, for direct measurement and loading of the reflectogram or other received signals, e.g. from tone measurements. The reflectogram may be obtained from a single location in the network, e.g. from the connection point of a local loop to a central office whereas other received signals used for direct measurement of transfer function may be received from other nodes of the network. The reflectogram or other received signals will generally be in analogue form and is converted into digital signals by an analogue/digital converter. The program then optimizes the coefficients of the parametric model, e.g. by minimizing a cost function relating to a difference between the measured reflectogram and a computed transfer function for the model or between the measured transfer function and a computed transfer function for the relevant model. Using the optimized parametric model a transfer function and/or a length of a loop of the network is determined. From the selected topology and the length of the loop, knowing the transfer function cross-talk related parameters can be calculated.

The output of the computer program can be any or all of the following:
crosstalk related parameters such as NEXT or FEXT transfer coefficients, one or more PSD's of a transmitter or received at a receiver, the power back-off required at a transmitter, a message that the network cannot be modeled with a reasonable accuracy (due to unusual topology, unusual materials) a length of a loop of the network.

The invention claimed is:

1. A method of modeling a network comprising a plurality of transmission lines, the method comprising:
    measuring loop parameters of a transmission line to provide measured loop parameters,
    determining a topology of the transmission line by analyzing the measured loop parameters with reference to at least a one model of a plurality of models for transmission lines of different topologies,
    selecting a further model for estimating crosstalk related parameter based on the determined topology, and
    estimating at least one crosstalk related parameter based on the determined topology and the selected further model.

2. The method according to claim 1 further comprising determining a transmit power spectrum for a transmitter on the network in accordance with the estimated crosstalk related parameter.

3. The method according to claim 1 wherein the crosstalk related parameter is a transfer function for at least one of FEXT, NEXT, alien-NEXT, alien-FEXT, EL-FEXT, EL-NEXT, self-NEXT, self-FEXT.

4. The method according to claim 1, wherein the measuring step includes carrying out a two-port measurement of the transmission line by inputting an excitation signal at one port of the transmission line and measuring the received signal at another port of the transmission line
    deriving from the received signal a transfer function of the transmission line;
    generating a 2-port parametric model of the transmission line; and
    optimizing values of the parameters of the 2-port parametric model by reducing the difference between the derived transfer function and a transfer function calculated from the at least one model.

5. The method according to claim 4, wherein the reducing step is carried out by minimizing a cost function by adapting the values of the parameters of the relevant parametric model, the cost function representing a quantification of the difference.

6. The method according to claim 4, further comprising the step of determining a length of the transmission line as an output of the optimizing step.

7. The method according to claim 1, wherein the measuring step comprises carrying out a 1 port measurement on network by inputting an excitation signal at one port of the network and recording the results at the port;
   generating a 1 port parametric model of the work;
   optimizing the values of the parameters of the 1 port parametric model by reducing the difference between the results of the measurement step and results calculated using the 1-port parametric model and the excitation signal.

8. A data carrier medium carrying one or more computer readable code segments for controlling a processing device to carry out a method in a accordance with claim 1.

9. A method for modeling a representation of network, said method comprises:
   transmitting a description of the network from a near location to a remote computing system via a telecommunications network,
   executing on the remote computer system any of the method of claim 1 to 6, and
   transmitting to a near location information relating to at least one crosstalk-related parameter.

10. A system for modeling a network, comprising:
   means for measuring loop parameters of first transmission line to provide measured loop parameters,
   means for determining a topology of the first transmission line by analyzing the measured loop parameters with reference to at least a one model of a plurality of models for transmission lines of different topologies,
   means for selection a further model for estimating crosstalk related parameters bases on the determined topology, and
   means for estimating at least one crosstalk related parameter based on the determined topology and the selected further model.

11. The system according to claim 10 further comprising means for determining a transmit power spectrum for a transmitter on the network in accordance with the estimated crosstalk related parameter.

12. The system according to claim 10, wherein the crosstalk related parameter is a transfer function for at least one of FEXT, NEXT, alien-NEXT, alien-FEXT, EL-FEXT, EL-NEXT, self-NEXT, self-FEXT.

13. The system according to claim 10, wherein the means for measuring includes means for carrying out a two-port measurement of the transmission line by inputting an excitation signal at one port of the transmission line and measuring the received signal at another port of the transmission line, further comprising:
   means for deriving from the received signal a transfer function of the transmission line;
   means for generating a 2-port parametric model of the transmission line; and
   means for optimizing values of the parameters of the 2-port parametric model by reducing the difference between the derived transfer function and a transfer function calculated from the at least one model.

14. The system according to claim 13, wherein the means for optimizing includes means for reducing the difference by minimizing a cost function by adapting the values of the parameters of the relevant parametric model, the cost function representing a quantification of the difference.

15. The system according to claim 13, wherein the means for optimizing includes means for determining a length of the transmission line.

16. The system according to claim 10, wherein the means for measuring comprises means for carrying out a 1 port measurement on the network by inputting an excitation signal at one port of the network and recording the results at the port; further comprising:
   means for generation a 1 port parametric model of the network; and
   means for optimizing the values of the parameters of the 1 port parametric model by reducing the difference between the results of the measurement step and results calculated using the 1-port parametric model and the excitation signal.

17. A computer program product embodied on a computer readable medium for execution of a method, the method comprising:
   a processor performing:
   measuring loop parameters of a transmission line to provide measured loop parameters,
   determining a topology of the transmission line by analyzing the measured loop parameters with reference to a least a one model of a plurality of models for transmission lines of different topologies,
   selection a further model for estimation crosstalk related parameters based on the determined topology, and
   estimating at least one crosstalk related parameter based on the determined topology and the selected further model.

* * * * *